United States Patent
Trisnadi

(10) Patent No.: US 10,218,947 B1
(45) Date of Patent: *Feb. 26, 2019

(54) COMPENSATION FOR OVERLAPPING SCAN LINES IN A SCANNING-BEAM DISPLAY SYSTEM

(71) Applicant: Prysm, Inc., San Jose, CA (US)

(72) Inventor: Jahja Trisnadi, Cupertino, CA (US)

(73) Assignee: Prysm, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,393

(22) Filed: Feb. 2, 2018

Related U.S. Application Data

(63) Continuation of application No. 15/164,535, filed on May 25, 2016, now Pat. No. 9,888,218.

(51) Int. Cl.
| H04N 9/31 | (2006.01) |
| H04N 17/00 | (2006.01) |
| H04N 17/02 | (2006.01) |

(52) U.S. Cl.
CPC ......... *H04N 9/3135* (2013.01); *H04N 9/3155* (2013.01); *H04N 9/3182* (2013.01); *H04N 9/3188* (2013.01); *H04N 17/02* (2013.01)

(58) Field of Classification Search
CPC ........ G01J 3/506; G01J 3/513; G02B 26/101; H04N 9/3135
USPC .... 348/181, 180, 189, 383, 747; 353/29, 30; 359/201.1, 204.1, 204.2, 205.1
See application file for complete search history.

(56) References Cited

U.S. PATENT DOCUMENTS

| 6,193,375 | B1 | 2/2001 | Nagata et al. |
| 9,041,762 | B2 | 5/2015 | Bai et al. |
| 9,052,521 | B2 | 6/2015 | Hajjar et al. |
| 9,888,218 | B1 * | 2/2018 | Trisnadi ............... H04N 9/3135 |
| 2008/0259223 | A1 | 10/2008 | Read et al. |
| 2011/0310354 | A1 * | 12/2011 | Fujimori ................ G03B 21/13 353/31 |
| 2014/0071403 | A1 * | 3/2014 | Hajjar ..................... G01J 3/506 353/29 |

* cited by examiner

*Primary Examiner* — Jefferey F Harold
*Assistant Examiner* — Jean W Desir
(74) *Attorney, Agent, or Firm* — Fish & Richardson P.C.

(57) ABSTRACT

A display system includes a display screen, a plurality of subsystems, and a control system. The plurality of subsystems each generate an excitation beam that carries image information and a servo beam. For each subsystem, a servo feedback detector receives feedback light of the servo beam, detects the servo feedback mark, and produces a monitor signal. For each subsystem, a control unit is operable to adjust optical energies carried by the excitation beam using a scaling factor. Two adjacent subsystems of the plurality of subsystems are configured such that in operation the areas scanned by the excitation beams of the two subsystems overlap in an overlap region. The control system is configured to determine a range of the overlap region based on the monitor signals from the servo feedback detectors of the adjacent subsystems, and to determine the scaling factors for the excitation beams for the overlap region.

20 Claims, 13 Drawing Sheets

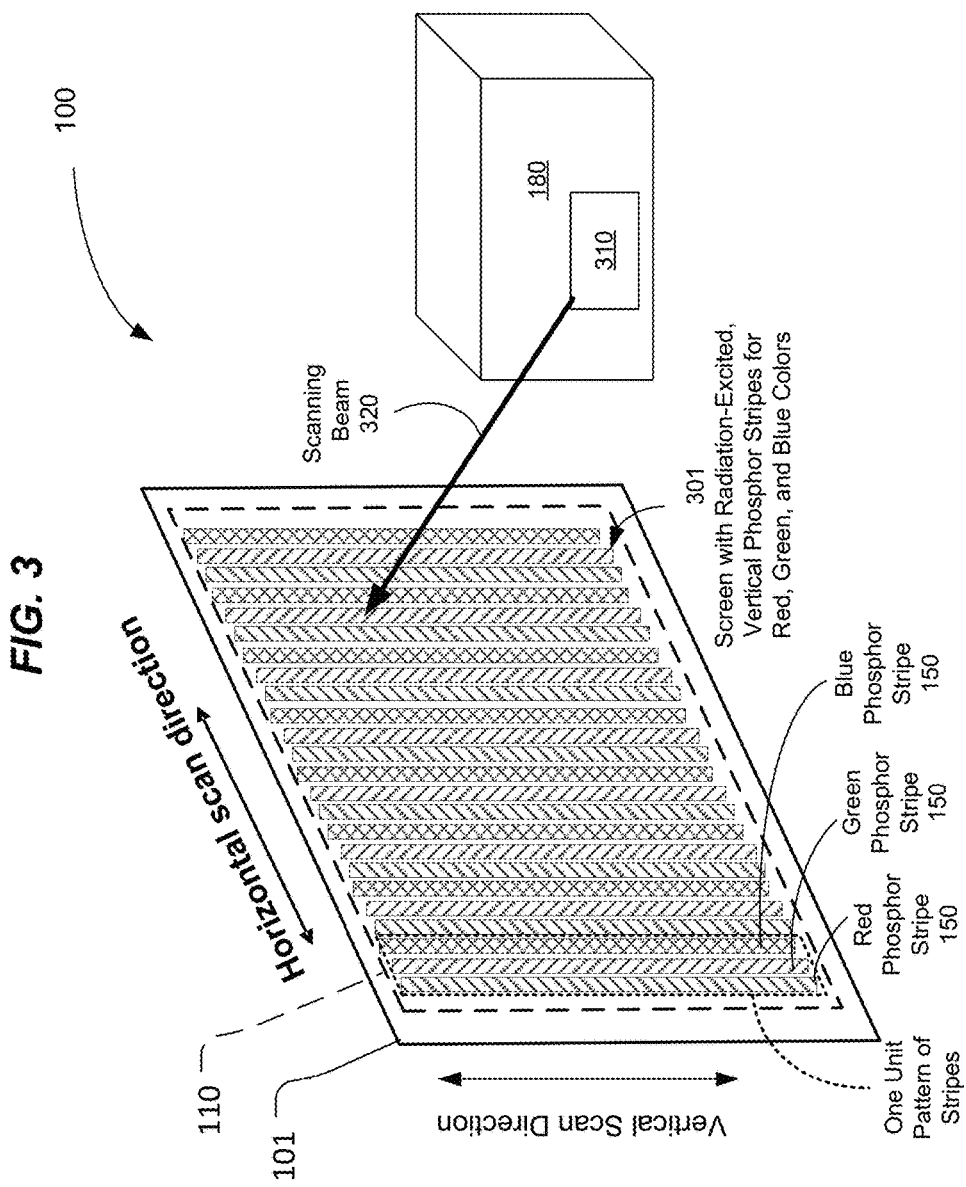

COMPENSATION FOR OVERLAPPING SCAN LINES IN A SCANNING-BEAM DISPLAY SYSTEM

CROSS-REFERENCE TO RELATED APPLICATIONS

This application is a continuation of U.S. patent application Ser. No. 15/164,535, filed May 25, 2016, the entire disclosure of which is incorporated by reference.

BACKGROUND

This document relates to scanning-beam display systems.

In a scanning-beam display system, an optical beam can be scanned over a screen to form images on the screen. Some display systems, such as some laser display systems, use a polygon scanner with multiple reflective facets to provide horizontal scanning and a vertical scanning mirror, such as a galvo-driven mirror, to provide vertical scanning. In operation, one facet of the polygon scanner scans one horizontal line as the polygon scanner spins to change the orientation and position of the facet and the next facet scans the next horizontal line. The horizontal scanning and the vertical scanning are synchronized to each other to project images on the screen.

SUMMARY

Examples and implementations of techniques and display systems are described that provide a display screen that includes constituent display regions, with each display region addressed by a separate scanning beam.

In one aspect, a display system includes a display screen, a plurality of subsystems, and a control system. The plurality of subsystems each include a light source to generate at least one beam, the at least one beam including an excitation beam that carries image information, a beam scanning module to receive the at least one beam and to direct the at least one beam onto a display region of the display screen, the beam scanning module configured to scan the at least one beam along a scanning direction across the display region, the display screen includes at least one servo feedback mark in the display region, a servo feedback detector positioned to receive feedback light of one or more of the at least one beam scanning on the display region, to detect the servo feedback mark from the feedback light, and to produce a monitor signal indicative of a position of the at least one beam on the display region, and a control unit operable to adjust optical energies carried by the excitation beam using one or more scaling factors. Two adjacent subsystems of the plurality of subsystems are configured such that in operation an area scanned by one or more excitation beams of a first subsystem of the adjacent subsystems overlaps with an area scanned by one or more excitation beams of a second subsystem of the adjacent subsystems in an overlap region. The control system is coupled to the plurality of the subsystems and configured to determine a range of the overlap region between the adjacent subsystems based on the monitor signals from the servo feedback detectors of the adjacent subsystems, and determine the scaling factors for the excitation beams for the overlap region of the adjacent subsystems.

Implementations may optionally include one or more of the following features.

The control system may be configured to determine a distance based on a time duration of a second monitor signal from the servo feedback detector, the distance being between the light source that generates the one or more of the at least one beam and the display region of the screen along a direction perpendicular to the scanning direction, and determine a position of the excitation beam on the display region based on the determined distance.

The control system may be configured to determine a variation of the range of the overlap region based on the determined position, and adjust the respective scaling factors for the excitation beams associated with the overlap region of the adjacent subsystems.

The control system may be configured to, for each of the adjacent subsystems, determine the position of the excitation beam on the display region based on the determined distance, the position of the one or more of the at least one beam, and predetermined spatial information between the one or more of the at least one beam and the excitation beam, and determine the range of the overlap region based on the determined positions of the excitation beams of the adjacent subsystems.

In operation, the excitation beam may scan over the display region to produce one or more scan lines on the display region extending along the scanning direction.

The control system may be configured to determine the range of the overlap region between the adjacent subsystems by determining respective scan lines produced by the excitation beams of the first and second subsystems on first and second display regions of the display screen, the first and second display regions being adjacent along a direction perpendicular to the scanning direction, and determining that one or more scan lines of the first subsystem and one or more scan lines of the second subsystem overlap within the overlap region.

The determined one or more scan lines of the first subsystem may be ordered from a first scan line to a last scan line along the direction, the first scan line of the first subsystem being closer to the second display region than the last scan line of the first subsystem, and the determined one or more scan lines of the second subsystem may be ordered from a first scan line to a last scan line along the direction, the first scan line of the second subsystem being closer to the first display region than the last scan line of the second subsystem.

The range of the overlap region may be determined to be $2\Lambda+(A-B)$, where $\Lambda$ is a gap between two sequential scan lines in one of the first and second subsystems, A is the first scan line of the first subsystem in the overlap region, and B is the last scan line of the second subsystem in the overlap region.

A respective scaling factor for each scan line of each of the first and second subsystems in the overlap region may be determined to be $n\Lambda/(2\Lambda+(A-B))$, where n represents an order number of the scan line in the one or more scan lines of the subsystem in the overlap region.

The control unit of the subsystem may be configured to adjust optical energies carried by the excitation beam based on adjustment of intensities of each scan line produced by the excitation beam in the overlap region by the respective scaling factor.

The control system may be configured to receive a first monitor signal indicative of a first position of a respective first servo beam on a first screen portion and a first time duration indicative a first distance between a first respective servo light source and the first screen portion along a direction perpendicular to the first screen portion, the first monitor signal being associated with a first servo feedback mark in the first screen portion, receive a second monitor signal indicative of a second position of the first servo beam or a respective second servo beam on a second screen portion and a second time duration indicative a second distance between a the first light source or a second respective servo light source and the second screen portion along a direction perpendicular to the second screen portion, the second monitor signal being associated with a second servo feedback mark in the second screen portion, the first and second servo feedback marks being parallel along the scanning direction, and determine a slope by dividing a difference between the first and second distances by a difference between the first and second positions.

The control system may be configured to determine a variation of a length of the overlap region along a direction perpendicular to the scanning direction based on the determined slope, and adjust the respective scaling factors for the excitation beams associated with the overlap region of the adjacent subsystems.

The control system may be configured to determine a maximum distance between two parallel servo feedback marks along the scanning direction based on a predetermined slope and a maximum distance tolerance perpendicular to the screen portions. The first and second servo feedback marks may be selected such that a distance between them is no more than the maximum distance.

The first screen portion and the second screen portion may be within a same display region provided by the same beam scanning module.

The first servo feedback mark may include start of line (SOL) reference mark of the display region, and the second servo feedback mark may include an end of line (EOL) reference mark of the display region.

The first screen portion and the second screen portion may be within two different display regions provided by different beam scanning modules.

The one or more beams may include the excitation beam and a servo beam at a wavelength different than the excitation beam.

The display region may include a second servo feedback mark. The servo feedback detector may be positioned to receive second servo feedback light of the one or more of the at least one beam scanning on the display region from the second servo feedback mark and to produce a second monitor signal indicative of a position offset of the one or more of the at least one beam on the display region along a direction perpendicular to the scanning direction. The control system may be configured to adjust the respective scaling factors for the excitation beams associated with the overlap region based on the position offset.

The second servo feedback mark may include a pair of triangle reference marks that are separated and spaced from each other in both the scanning direction and the direction perpendicular to the scanning direction to maintain an overlap along the scanning direction.

The control system may be configured to determine, by using an optical simulation model, an average position along a direction perpendicular to the scanning direction based on overlap regions over the entire screen to ensure display brightness uniformity of the images across the entire screen, normalize the overlap regions based on the determined average position, and generate the scaling factors based on the normalized overlap regions.

Potential advantages may include (and are not limited to) one or more of the following.

The brightness uniformity of a display can be improved. In particular, where adjacent regions of a display are addressed by separate scanning beams, areas of increased brightness at the edges of the regions can be reduced or avoided, or the brightness difference of such areas relative to the centers of the regions can be reduced. The likelihood of visual artifacts resulting from the use of separate scanning beams to address different regions can be reduced. In general, the use of separate scanning beams to address different regions can be made less noticeable, thereby improving the display quality. The technique can be applied dynamically, and can adjust for motion of the display screen relative to the scanning beam source. As a result, display screens that are located in open environment (e.g., where the screen might be subject to motion due to being touched or from wind) can be made larger or of lighter material, yet still avoid visual artifacts.

The details of one or more embodiments are set forth in the accompanying drawings and the description below. Other aspects, features and advantages will be apparent from the description, drawings and claims.

BRIEF DESCRIPTION OF THE DRAWINGS

FIG. 3 shows an example scanning laser display system having a light-emitting screen made of laser-excitable light-emitting materials (e.g., phosphors) emitting colored lights under excitation of a scanning laser beam that carries the image information to be displayed.

DETAILED DESCRIPTION

In various display systems a display screen can have regions that are separately addressed. If the regions are addressed by separate scanning beams, there is a danger that adjacent regions of the screen addressed by separate beams will overlap in some areas. In particular, the adjacent regions might overlap at their edges. Because this area of overlap is excited by multiple scanning beams, it can be brighter than the remainder of a region, e.g., away from the edge, such as near the center of the region. This brighter area of overlap between two adjacent constituent regions can extend along a straight or curved line along or in close proximity to the edge, and can render the overall display screen to have a tiled appearance, thus adversely affecting the image quality of the large screen formed by the constituent screens.

However, by reducing the intensity one or both of the scanning beams as they address the overlapping area, this tiled appearance can be reduced or eliminated. In particular, the system can determine variations in distance of the display screen from the scanning beam source, and use this information to determine the degree of overlap. This permits the scanning beam intensity to be adjusted dynamically. This can permit the display to compensate for effects, e.g., touch by user or wind, that might move the display screen or portions thereof towards or away from the rest position of the screen.

Figure 1A:
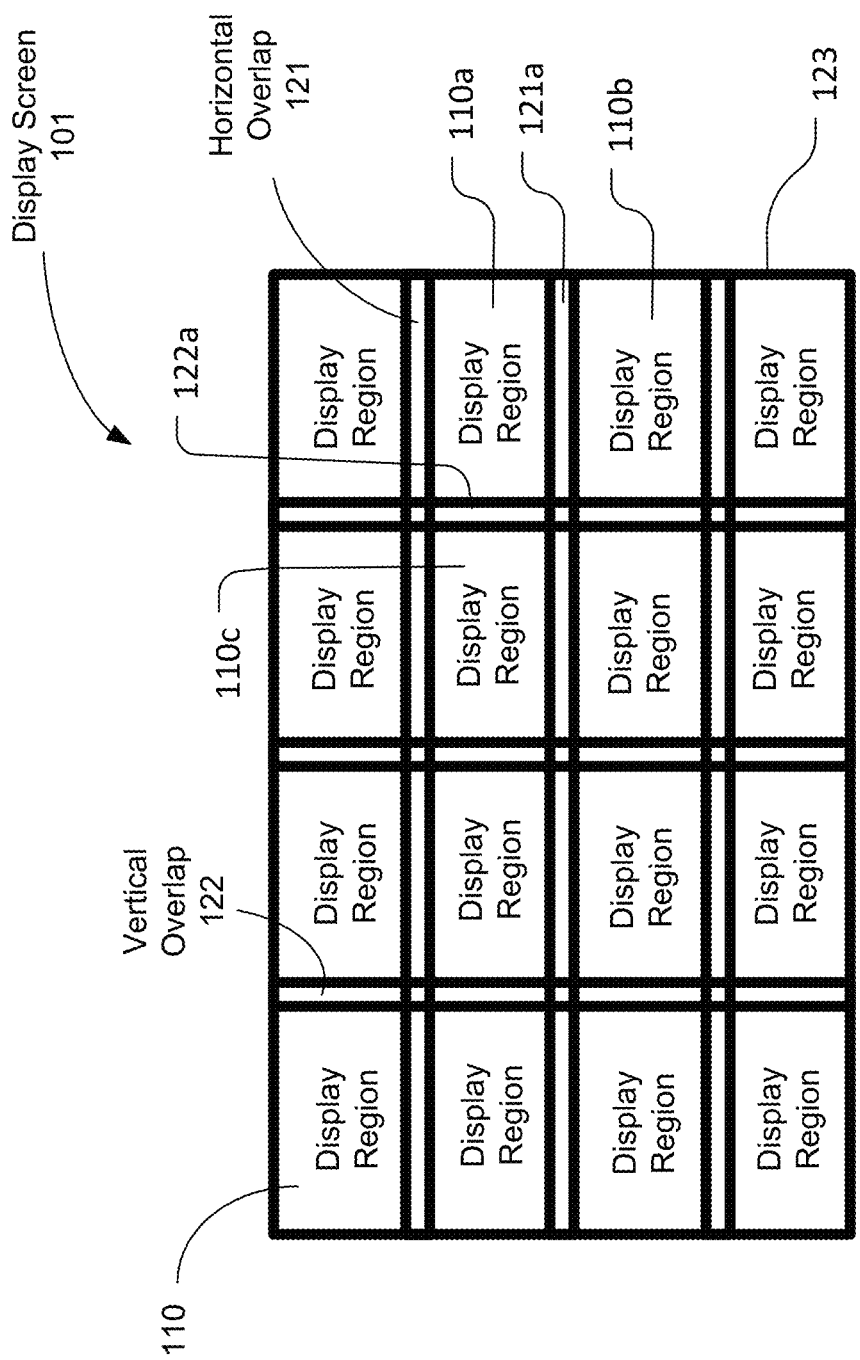
FIG. 1A shows an example of a display screen with multiple constituent display regions.

FIG. 1A shows an example of a display screen 101 on which multiple constituent display regions 110 are generated by multiple scanning beam engines. The display regions 110 are arranged in an array, e.g., a rectangular array. Each display region 110 can be quadrilateral, e.g., generally rectangular except for effects from keystoning, although this is not required.

Each display region 110 can overlap an adjacent region at their common edge. For example, two display regions 110a and 110b that are vertically adjacent can have an area 121a where they overlap vertically. Similarly, two display regions 110a and 110c that are horizontally adjacent can have an area 122a where they overlap horizontally. As a result, there can be areas 121 of horizontal overlap that run along the vertical direction of the screen, and areas 122 of vertical overlap that runs along the horizontal direction of the screen. Without compensation, such areas 121 and 122 tend to be visible to viewers and separate the full image of the tiled screen into visible grids. In some implementations, timing of scanning beam can be used to avoid areas 121 of horizontal overlap 121, and the techniques described are used to compensate for just vertical overlap 122.

The display regions 110 at the edge of the display screen will include areas at the edge of the display region don't overlap with another region. For example, display region 110a includes an area adjacent edge 123 that doesn't overlap with another region. As such, the brightness of these edge areas do not need to be adjusted, and can be at the standard brightness level as the remainder of the display region. More generally, other than the edges of adjacent display regions, the remainder of each display region need not be subject to overlap.

Figure 1B:
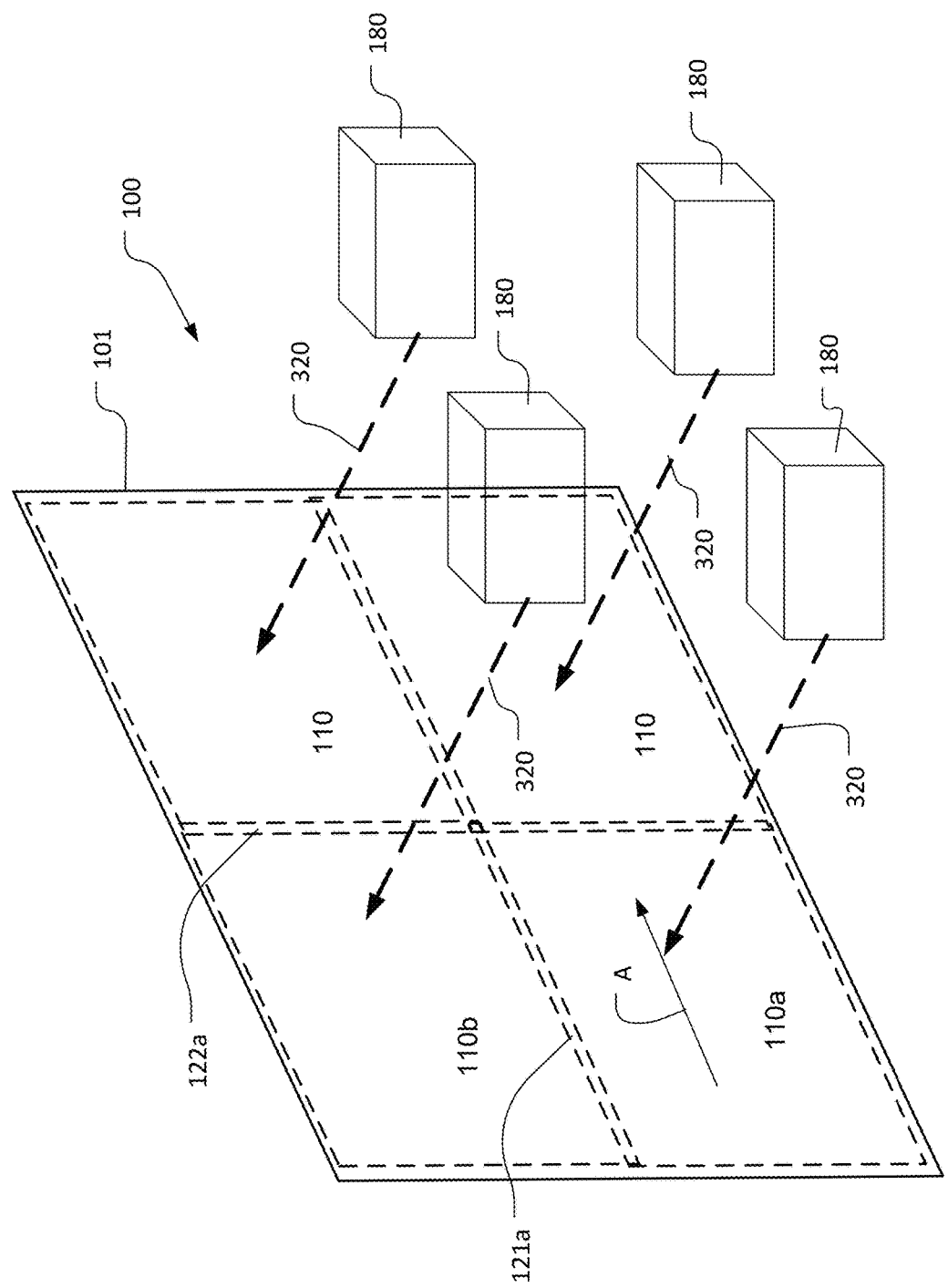
FIG. 1B shows an example of multiple scanning beams being used to address multiple display regions of a display screen.
Figure 2:
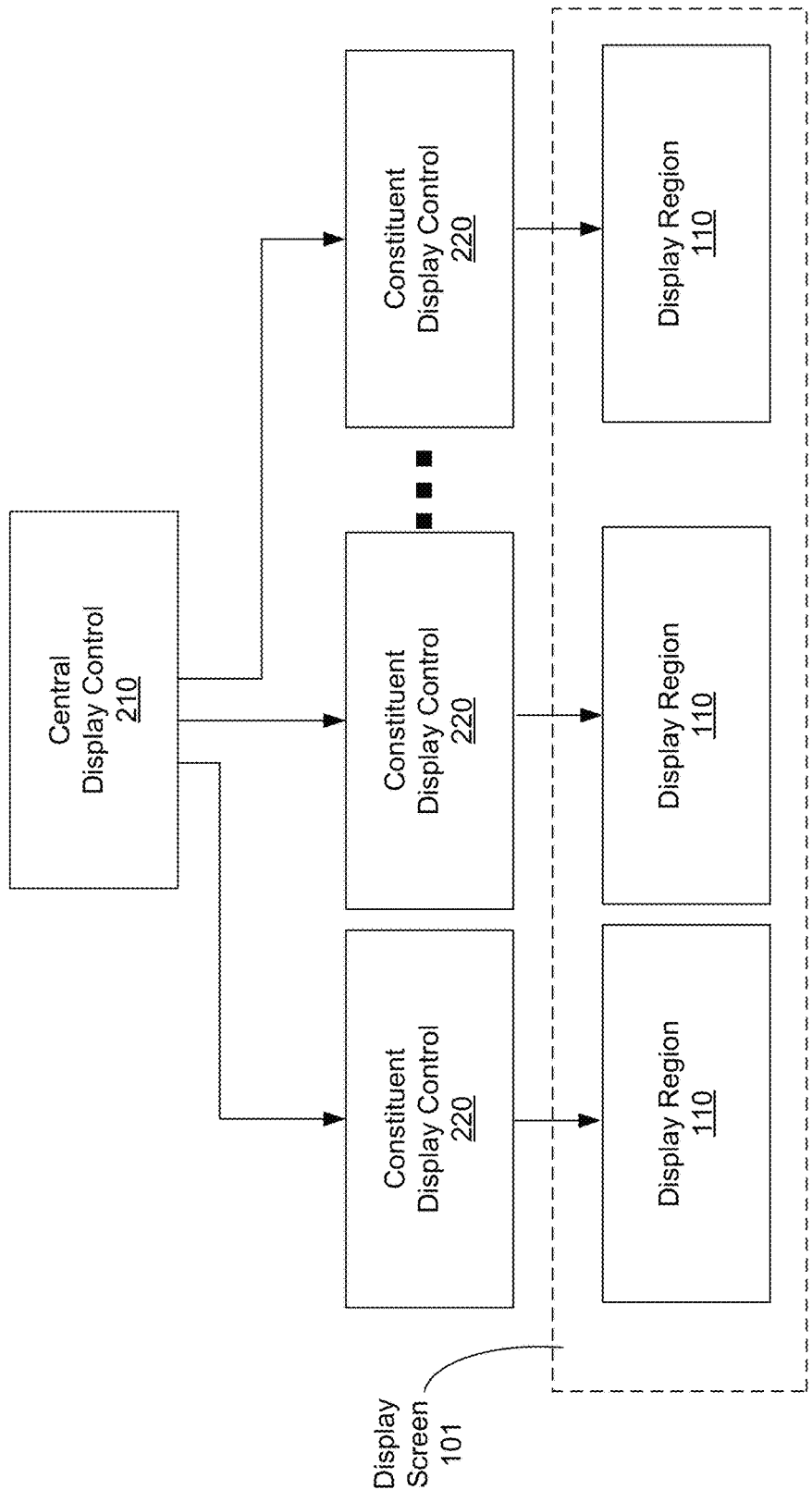
FIG. 2 shows an example of a control for the display screen in FIG. 1.

FIG. 2 shows an example of the control system for the display screen 101 in FIG. 1. In this example, each constituent display region 110 has its own display control 220 that controls the operations of each display region 110. A central control 210 for the display 100 is connected in communication with the display controls 220 for the constituent display region 110 and control each region 110 to display a fraction or portion of the full image displayed by the display screen 100. The central control 210 can be programmed to control, e.g., by providing signals to the constituent display controls 220, selected areas of each display region 110 that are on a border with another adjacent screen 110 to have a lower display brightness in order to reduce the visibility of the overlap 121 or 122 of adjacent regions 110.

Alternatively, the central control 210 can be eliminated, and each constituent display control 220 could operate independently, with each be programmed to control selected areas of each display region 110 that are on a border with another adjacent screen 110 to have a lower display brightness in order to reduce the visibility of the overlap 121 or 122 of adjacent regions 110.

Referring to FIGS. 1A and 1B, the display screen 101 can be part of a scanning beam display system 100. As shown in FIG. 1B, for each display region 110 there is an associated scanning beam engine 180. Each scanning beam engine 180 generates a scanning beam 320, e.g., an light beam, e.g., a laser beam, that scans, e.g., raster scans, across the associated display region 110, e.g., as shown by arrow A. As noted above, adjacent regions of the screen addressed by separate beams will overlap in some areas. In particular, the adjacent regions might overlap at their edges. For example, vertically adjacent display regions 110a and 110b can vertically overlap in a horizontally extending area 121a.

In a scanning beam display system, each display region 110 of the screen 101 can include light-emitting materials or fluorescent materials that emit light under excitation from the associated scanning beam 320. In some implementations, three different color phosphors that are optically excitable by the laser beam to respectively produce light in red, green, and blue colors suitable for forming color images may be formed on the screen as pixel dots or repetitive red, green and blue phosphor stripes in parallel.

Phosphor materials are one type of fluorescent materials. However, other optically excitable, light-emitting, non-phosphor fluorescent materials can be used. For example, quantum dot materials emit light under proper optical excitation and thus can be used as the fluorescent materials for systems and devices in this application. More specifically, semiconductor compounds such as, among others, CdSe and PbS, can be fabricated in form of particles with a diameter on the order of the exciton Bohr radius of the compounds as quantum dot materials to emit light. To produce light of different colors, different quantum dot materials with different energy band gap structures may be used to emit different colors under the same excitation light. Some quantum dots are between 2 and 10 nanometers in size and include approximately tens of atoms such between 10 to 50 atoms. Quantum dots may be dispersed and mixed in various materials to form liquid solutions, powders, jelly-like matrix materials and solids (e.g., solid solutions). Quantum dot films or film stripes may be formed on a substrate as a screen for a system or device in this application. In one implementation, for example, three different quantum dot materials can be designed and engineered to be optically excited by the scanning laser beam as the optical pump to produce light in red, green, and blue colors suitable for forming color images. Such quantum dots may be formed on the screen as pixel dots arranged in parallel lines (e.g., repetitive sequential red pixel dot line, green pixel dot line and blue pixel dot line).

A scanning beam display system uses at least one scanning beam to excite color light-emitting materials deposited on a screen to produce color images. The scanning beam is modulated to carry images in red, green and blue colors or in other visible colors and is controlled in such a way that the scanning beam excites the color light-emitting materials in red, green and blue colors with images in red, green and blue colors, respectively. Hence, the scanning beam carries the images but does not directly produce the visible light seen by a viewer. Instead, the color light-emitting fluorescent materials on the screen absorb the energy of the scanning beam and emit visible light in red, green and blue or other colors to generate actual color images seen by the viewer.

FIG. 3 illustrates an example of a scanning beam display system 100. The system includes a scanning beam engine 180 that includes a light source 310, e.g., a laser module, to produce and project at least one scanning beam 320, e.g., a laser beam, onto a display region 110 of the screen 101. Although this system illustrates only a single scanning beam engine 180, the discussion below can be applied to each scanning beam engine 180 and each display region of the screen 101.

Laser excitation of the fluorescent materials using one or more laser beams with energy sufficient to cause the fluorescent materials to emit light or to luminesce is one of various forms of optical excitation. In other implementations, the optical excitation may be generated by a non-laser light source that is sufficiently energetic to excite the fluorescent materials used in the screen. Examples of non-laser excitation light sources include various light-emitting diodes (LEDs), light lamps and other light sources that produce light at a wavelength or a spectral band to excite a fluorescent material that converts the light of a higher energy into light of lower energy in the visible range.

The excitation optical beam that excites a fluorescent material on the screen can be at a frequency or in a spectral range that is higher in frequency than the frequency of the emitted visible light by the fluorescent material. Accordingly, the excitation optical beam may be in the violet spectral range and the ultra violet (UV) spectral range, e.g., wavelengths under 420 nm. In the examples described below, a violet or a UV laser beam is used as an example of the excitation light for a phosphor material or other fluorescent material and may be light at other wavelength.

In the example scanning beam display system illustrated in FIG. 3, the screen 101 has parallel color phosphor stripes 150 that extend in the vertical direction. Pairs of adjacent phosphor stripes 150 are made of different phosphor materials that emit light in different colors. In the illustrated example, red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green and blue. Other color sequences may also be used.

The scanning beam 320 is at the wavelength within the optical absorption bandwidth of the color phosphors and is usually at a wavelength shorter than the visible blue and the green and red colors for the color images. As an example, the color phosphors may be phosphors that absorb UV light in the spectral range below 420 nm to produce desired red, green and blue light.

The light source 310 can include one or more lasers such as UV diode lasers to produce the beam 320, a beam scanning mechanism to scan the beam 320 horizontally and vertically to render one image frame at a time on the screen 101, and a signal modulation mechanism to modulate the beam 320 to carry the information for image channels for red, green and blue colors. Such display systems may be configured as rear scanning systems where the viewer and the scanning beam engine 180 are on the opposite sides of the screen 101. Alternatively, such display systems may be configured as front scanning systems where the viewer and scanning beam engine 180 are on the same side of the screen 101.

Although phosphor stripes are described above, alternatively, the display screen 101 could include color pixilated light-emitting areas that define the image pixels on the screen.

Figure 4A:
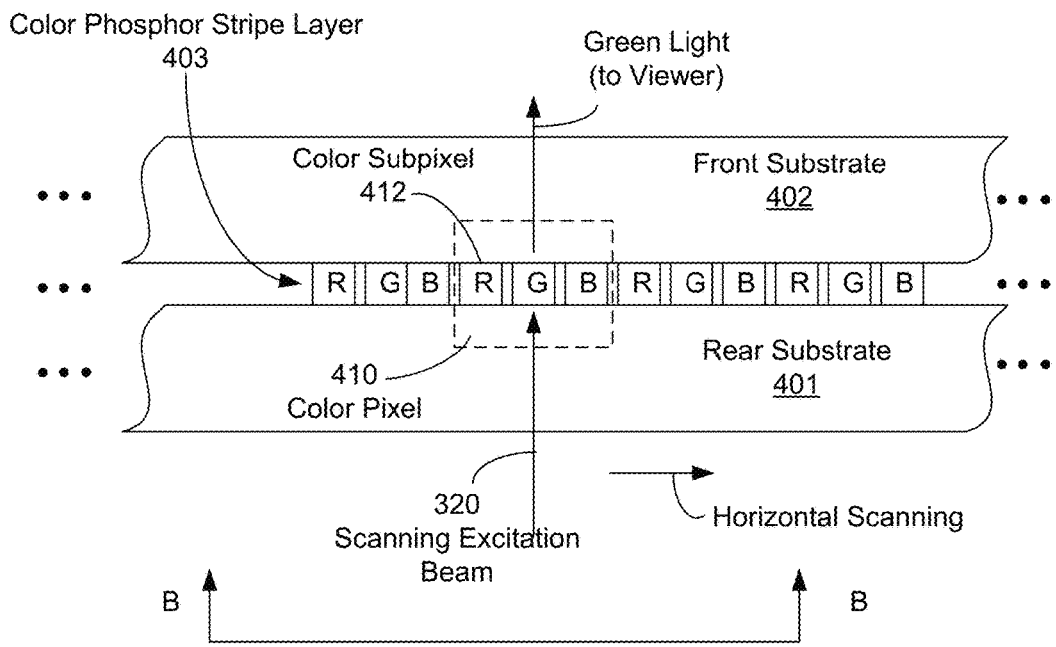
FIGS. 4A and 4B show one example screen structure with parallel light-emitting stripes and the structure of color pixels on the screen in FIG. 2.

FIG. 4A shows an exemplary design of the screen 101 in FIG. 3. The screen 101 may include a rear substrate 401 which is transparent to the scanning beam 320 and faces the light source 310 to receive the scanning beam 320. A second front substrate 402, is fixed relative to the rear substrate 401 and faces the viewer in a rear scanning configuration. In some implementation, the front substrate is used; the color phosphor stripe layer is exposed.

A color phosphor stripe layer 403 is placed between the substrates 401 and 402 and includes phosphor stripes. The color phosphor stripes for emitting red, green and blue colors are represented by "R", "G" and "B," respectively. The front substrate 402 is transparent to the red, green and blue colors emitted by the phosphor stripes. The substrates 401 and 402 may be made of various materials, including glass or plastic panels. The rear substrate 401 can be a thin film layer and can be configured to reflect the visible energy toward the viewer.

Each color pixel includes portions of three adjacent color phosphor stripes in the horizontal direction and its vertical dimension is defined by the beam spread of the scanning beam 320 in the vertical direction. As such, each color pixel includes three subpixels of three different colors (e.g., the red, green and blue). The module 180 scans the scanning beam 320 one horizontal line at a time, e.g., from left to right and from top to bottom to fill the screen 101.

Figure 4B:
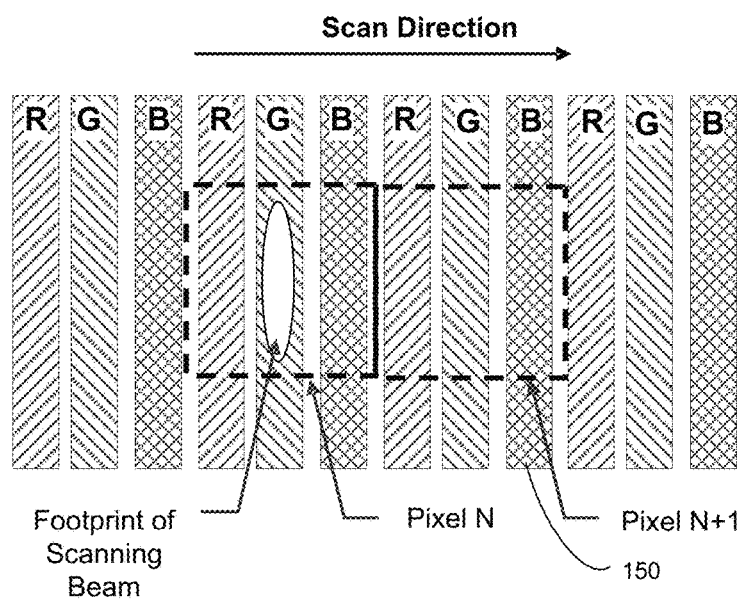

FIG. 4B further shows the operation of the screen 101 in a view along the direction B-B perpendicular to the surface of the screen 101. Since each color stripe 150 is longitudinal in shape, the cross section of the beam 320 may be shaped to be elongated along the direction of the stripe to maximize the fill factor of the beam within each color stripe for a pixel. This may be achieved by using a beam shaping optical element in the scanning beam engine 180.

Figure 5A:
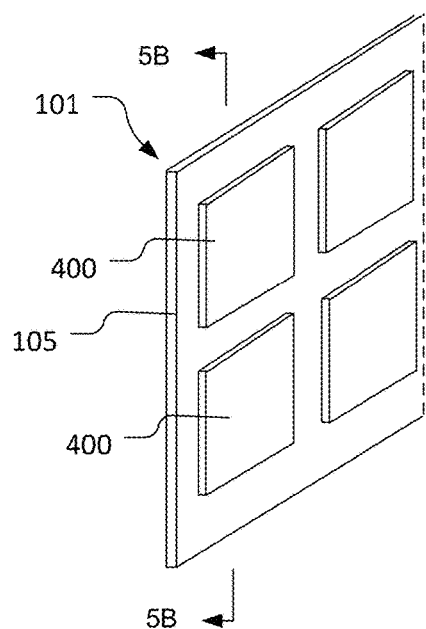
FIGS. 5A and 5B show an example of a display screen with multiple sub-screens.
Figure 5B:
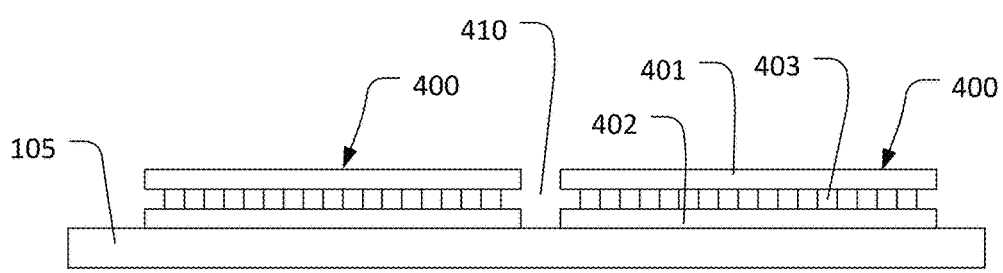

Referring to FIGS. 5A and 5B, the display screen 101 can be include multiple discrete display panels 400, with each panel 400 including a color phosphor stripe layer 403 placed between a front substrate 402 and a rear substrate 401, as described above for FIG. 4A. In particular, as shown in FIG. 5B, in some implementations, the display screen 101 includes a continuous backing sheet 105. Each panel 400 is secured to the backing sheet 105.

Assuming the panels 400 are secured to the side of the backing sheet 105 farther from the viewer, the front substrate 402 is closer to the backing sheet 105 than the rear substrate 401. Again assuming the panels 400 are secured to the side of the backing sheet farther from the viewer, the backing sheet 105 is a transparent to the visible light from the phosphors. For example, the backing sheet can be a hard plastic. Alternatively for this configuration, the backing sheet 105 could itself serve as the front substrate, i.e., there is no substrate 402 between the color phosphor stripe layer and the backing sheet 105.

Alternatively, the panels could be secured to the side of the backing sheet closer to the viewer. In this case, the rear substrate 401 is closer to the backing sheet 105 than the front substrate 402, and the backing sheet 105 is transparent to the scanning beam 320. Alternatively for this configuration, the backing sheet 105 could itself serve as the back substrate, i.e., there is no substrate 401 between the color phosphor stripe layer and the backing sheet 105. Alternatively for this configuration, the backing sheet 105 could itself serve as the front substrate, i.e., there is no front substrate 402 between the color phosphor stripe layer and the backing sheet 105.

Alternatively, the display screen 101 could be assembled from multiple panels 400 without a backing sheet 105, e.g., by taping edges of individual panels 400 together.

Each scanning beam engine 180 can include a laser source to produce a scanning laser beam that excites a phosphor material on the screen may be a single mode laser or a multimode laser. The laser may also be a single mode along the direction perpendicular to the elongated direction phosphor stripes to have a beam spread that is confined by and is smaller than the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color subpixel on the screen and to provide sufficient laser power in the beam via the multimodes to ensure sufficient brightness of the screen.

Figure 6A:
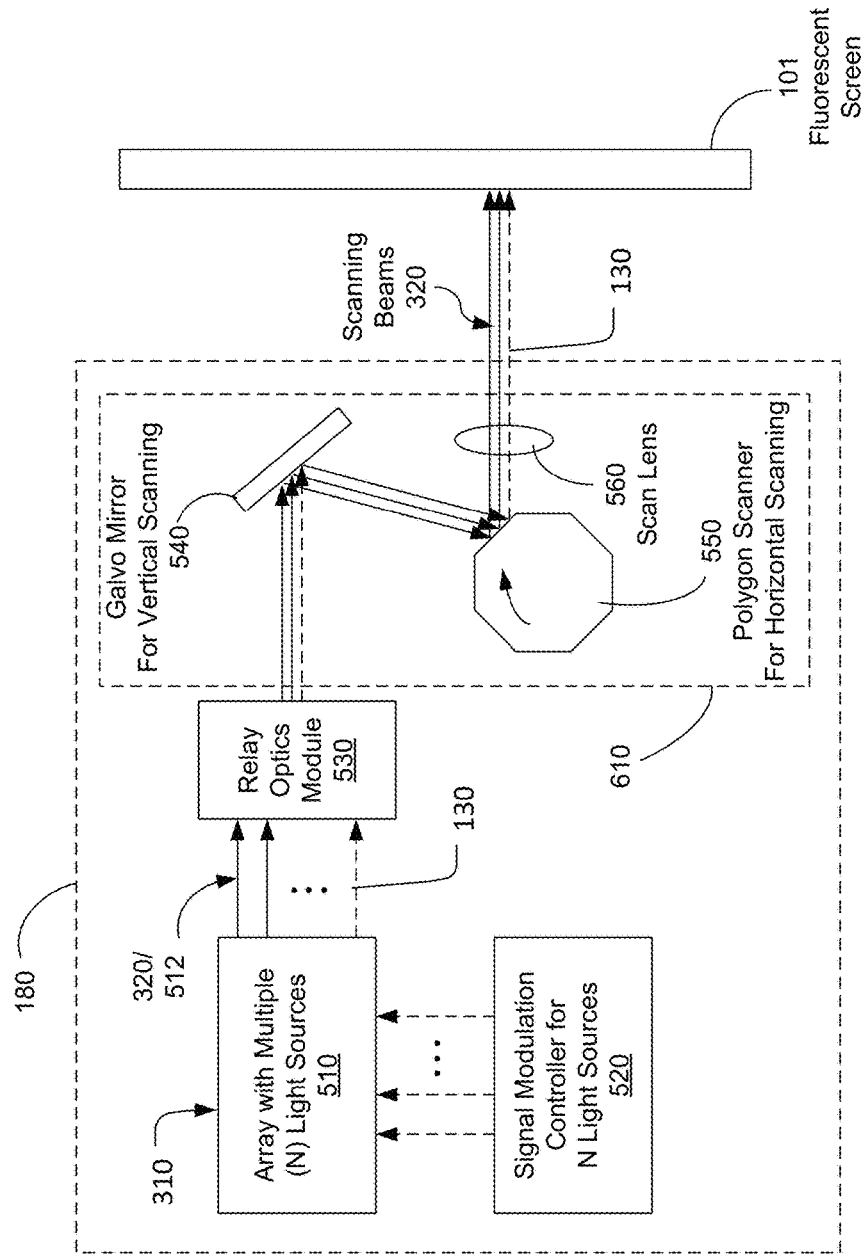
FIG. 6A shows an example implementation in a pre-objective scanning configuration.

FIG. 6A shows an example implementation of the scanning beam engine 180. The scanning beam engine 180 includes a light source 310 to generate multiple excitation beams 320 to simultaneously scan the screen 101. The excitation beams 320 can be laser beams. For example, the light source 310 can be a laser array 510 with multiple lasers to generate multiple laser beams 512.

A signal modulation controller 520 is provided to control and modulate the excitation beam 320. For example, the modulation controller 520 can control and modulate the lasers in the laser array 510 so that the laser beams are modulated to carry the image to be displayed on the screen 101. The signal modulation controller 520 can include a digital image processor that generates digital image signals for the three different color channels. The signal modulation controller 520 can include laser driver circuits that produce laser control signals carrying the digital image signals. The laser control signals are then applied to modulate the lasers, e.g., the currents for laser diodes, in the laser array 510.

The beam scanning can be achieved by a scanning projection module 610. The scanning projection module can include a scanning mirror 540 such as a galvo mirror for the vertical scanning and a multi-facet polygon scanner 550 for the horizontal scanning. A scan lens 560 can be used to project the scanning beams from the polygon scanner 550 onto the screen 101. The scan lens 560 is designed to image each beam 512 onto the screen 101. Each of the different reflective facets of the polygon scanner 550 simultaneously scans N horizontal lines where N is the number of beams 320. Such a system is described in U.S. Pat. No. 9,041,762, incorporated herein by reference for that purpose.

Figure 6B:
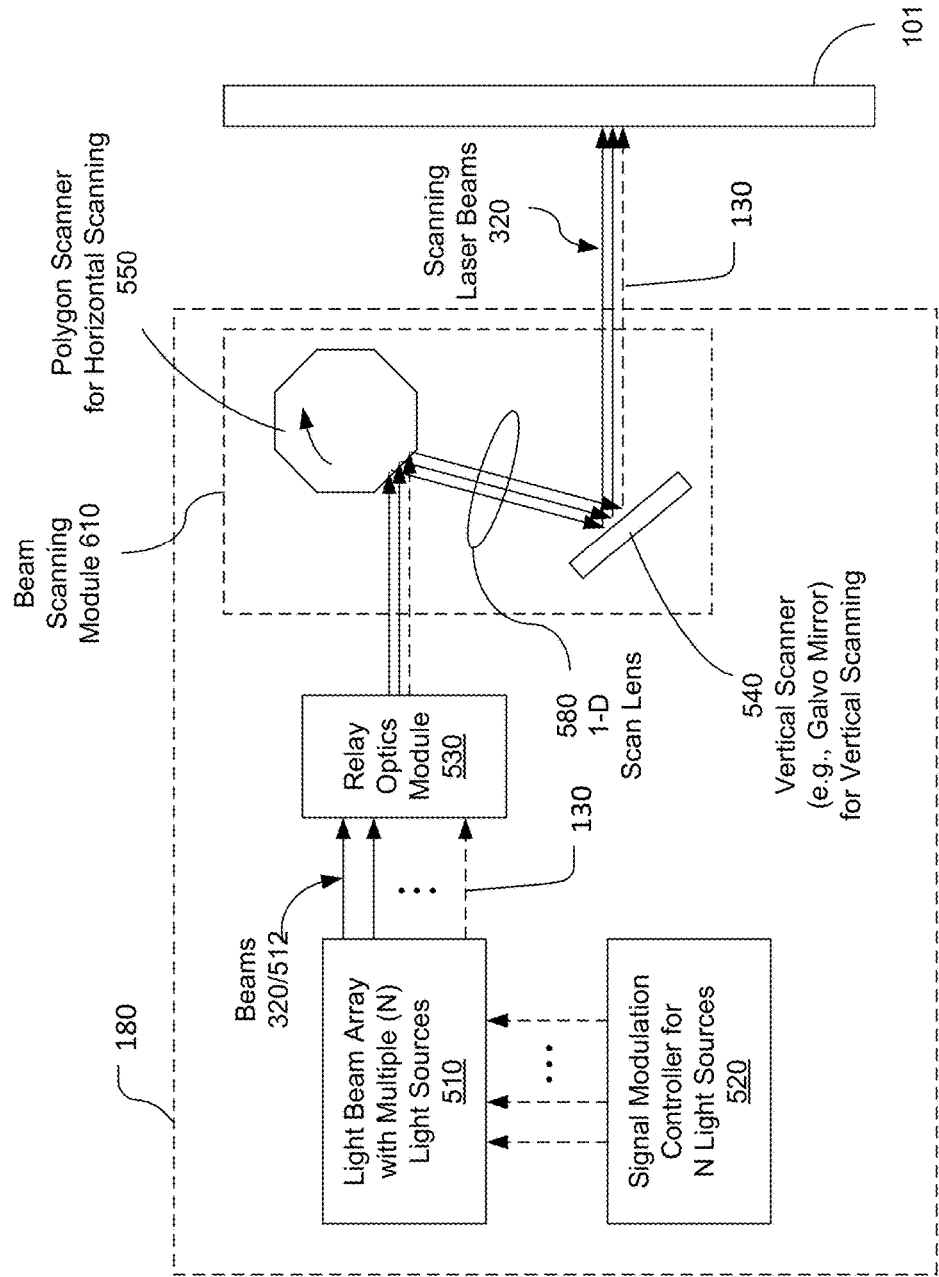
FIG. 6B shows an example implementation of a post-objective scanning beam display configuration.

In the example illustrated in FIG. 6A, the excitation beams 320 are first directed to the galvo mirror 540 and then from the galvo mirror 540 to the polygon scanner 550. Alternatively, as shown in the example illustrated in FIG. 6B, the excitation beams 320 are first directed to the polygon scanner 550 and then from the polygon scanner 550 to the galvo mirror 540. Other possibilities for the scanning projection module 610 include multiple galvo mirrors, multiple polygon scanners, or an array of micro-mirrors, e.g., a digital micromirror device (DMD).

The excitation beams 320 are scanned spatially across the screen 101 to hit different color pixels at different times. Accordingly, each of the modulated beams 320 carries the image signals for the red, green and blue colors for each pixel at different times and for different pixels at different times. Hence, the modulated beams 320 are coded with image information for different pixels at different times by the signal modulation controller 520. The excitation beam scanning thus maps the time-domain coded image signals in the beams 320 onto the spatial pixels on the screen 101. For example, the modulated beams 320 can have each color pixel time equally divided into three sequential time slots for the three color subpixels for the three different color channels. The modulation of the beams 320 may use pulse modulation techniques to produce desired grey scales in each color, a proper color combination in each pixel, and desired image brightness.

In one implementation, the multiple beams 320 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 550, the beams 320 may not be aligned with each other along the vertical direction on the screen 101 and may be at different positions on the screen 101 along the horizontal direction. The beams 320 can only cover one portion of the screen 101.

Figure 7:
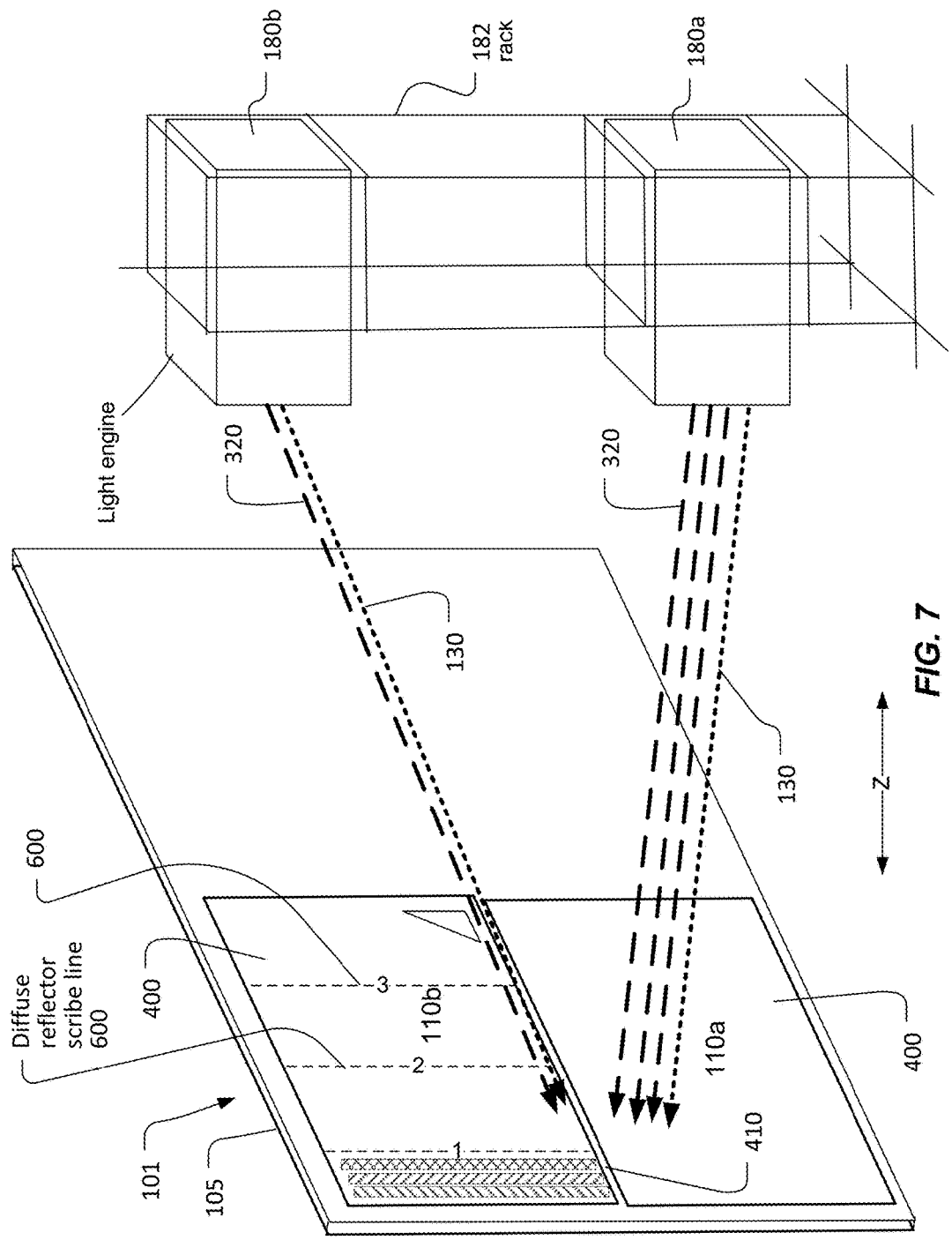
FIG. 7 shows an example of multiple scanning beams being used to address multiple display regions of a display screen.

FIG. 7 illustrates a scanning beam display 100 that includes a screen 101 being addressed by multiple scanning beam engines 180, e.g., scanning beam engines 180a and 180b. The scanning beam engines 180 are secured to a rack 182 to maintain the engines 180 in a fixed position relative to each other in all three axes.

Each scanning beam engine generates one or more excitation beams 320 to address a different region 110. For example the beams 320 from engine 180a can address region 110a, and the beams from engine 180b can address region 110b. Each region 110 can include the parallel fluorescent stripes 150 (only three stripes are illustrated so that location of the scribe marks 600 can be shown).

Despite the presence of a gap 410 between adjacent panels 400, it is possible for the adjacent regions 110 scanned by scanning beam engines 180 to overlap. For example, vertically adjacent regions 110a and 110b can overlap in a horizontally extending area. In some situations, the scanning beam engines 180 can be calibrated so that the adjacent regions 110 deliberately overlap. A deliberate overlap may be desirable to avoid generation of a gap between the display regions if the display screen 101 moves toward the scanning beam engine 183. Such a gap can be visually apparent and detract from the quality of the display.

Figure 8:
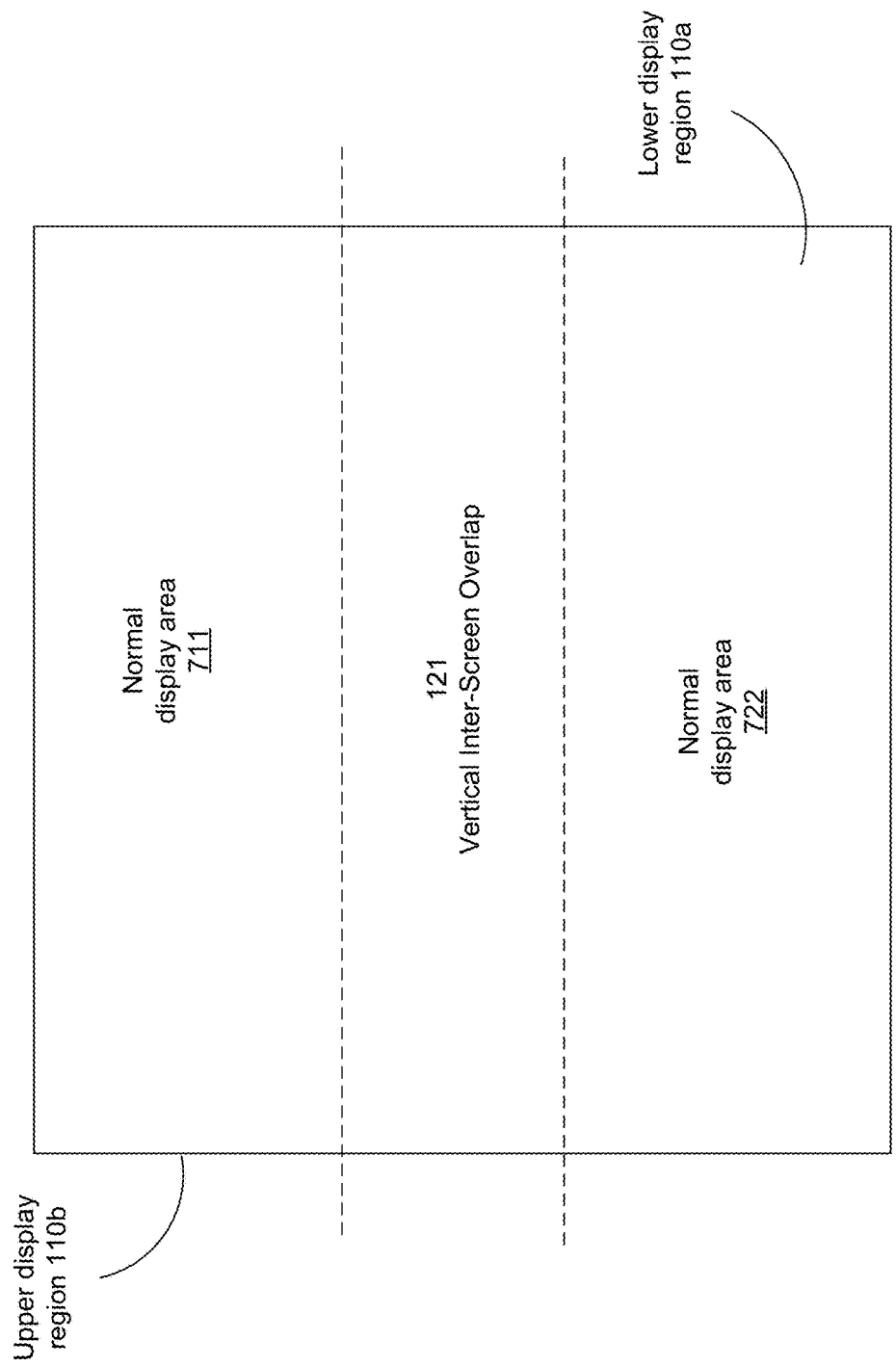
FIG. 8 illustrates an example of an area of overlap of two adjacent display regions.

To compensate for the increased brightness in the area of overlap, the brightness of pixels in the overlapping area can be reduced, e.g., by reducing the power of the scanning excitation beam 320. For example, referring to FIG. 8, if display regions 110a and 110b overlap in an area 121, the brightness of the pixels of region 110a in area 121 can be reduced and/or the brightness of the pixels of region 110b in area 121 can be reduced. On the other hand, the brightness level outside of the area 121, e.g., in normal display areas 711, 722, need not be adjusted.

In some implementations, the brightness of pixels in the overlapping area 121 are reduced such that the contribution from the particular region decreases monotonically with the distance of the pixel to the edge of the region. For example, a correction factor can be applied that linearly decreases the brightness over the region of the overlap 121.

Figure 9:
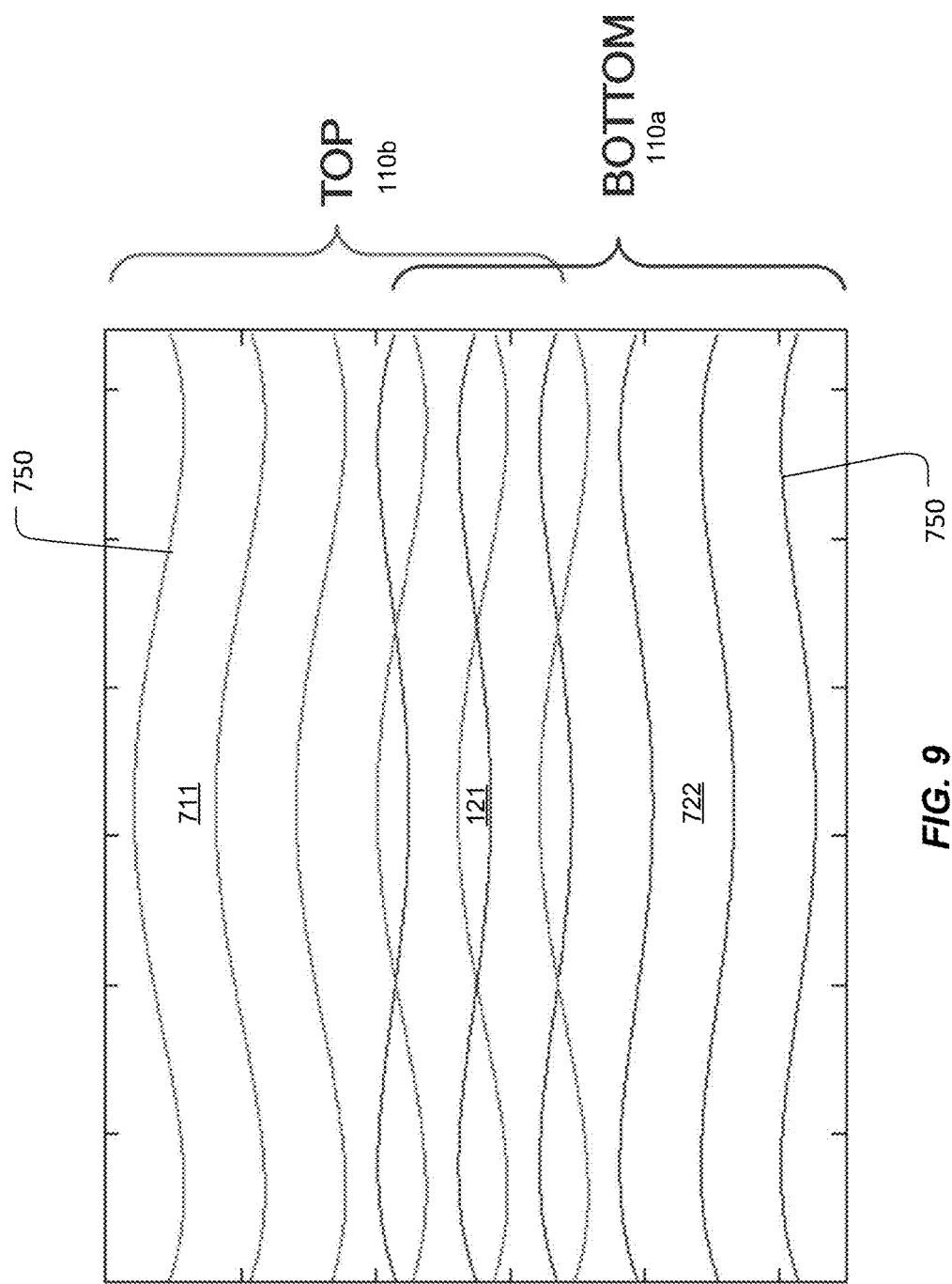
FIG. 9 illustrates an example of overlapping scan lines from two different scanning beam engines.

As shown in FIG. 9, each region 110 includes multiple scan lines 750. Although the scan lines 750 nominally run horizontally, due to a variety of optical effects, the scan lines 750 can actually have a slight oscillation in the vertical direction, e.g., the scan lines can be slightly sinusoidal-like.

Figure 10A:
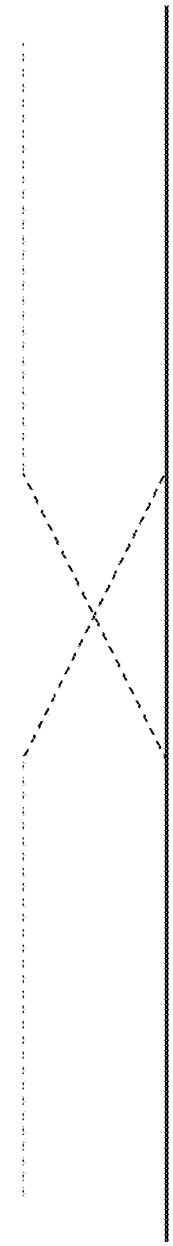
FIGS. 10A and 10B illustrate an example of modification of the intensity of brightness of pixels in the area of overlap.
Figure 10B:
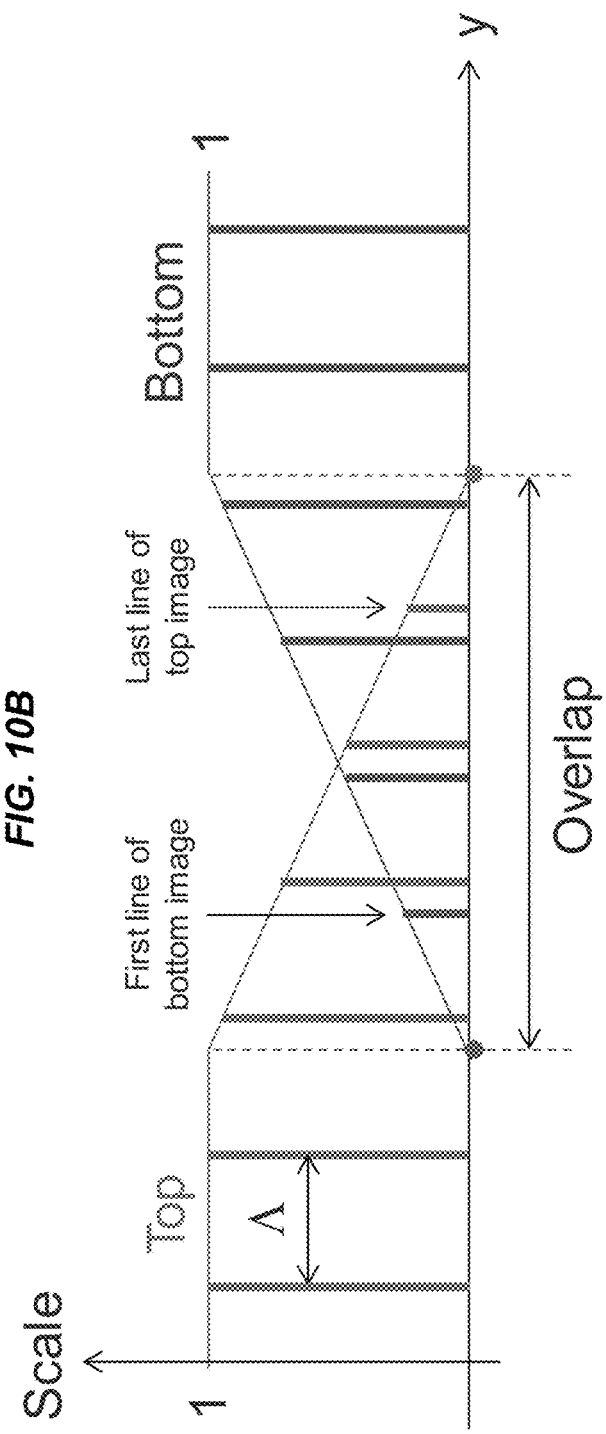

Referring to FIGS. 10A and 10B, one technique for determining a scale factor for the adjustment to each pixel is to first determine a width of the overlap area 121. In some implementations, the width of the overlap area 121 can be determined in a calibration procedure in which the light engines are activated and the overlap area 121 is measured manually. In some implementations, the width of the overlap area 121 can be determined by optical modelling.

In particular, the width of the overlap area can be defined as:

$$2\Lambda+(A-B),$$

where $\Lambda$ is the width of a gap between two sequential scan lines in one of the first and second subsystems, and (A−B) is the distance between the first scan line of the bottom image generated by the first subsystem in the overlap area and the last scan line of the top image generated by the second subsystem in the overlap area.

The respective scaling factor s for each scan line can then be calculated as $$s=n\Lambda/(2\Lambda+(A-B))$$

where n represents an order number of the scan line in the one or more scan lines of the subsystem in the overlap region. For example, for the lower display region 110a, the first scan line within the overlap region (i.e., within the overlap area 121 but furthest from the normal display area 722) would be n=1, the second (i.e., second furthest from the normal display area 722) would be n=2, etc. The scaling factor s can have a maximum value of 1.

The scaling factor can then be applied to the initial brightness $I_{INITIAL}$ of each pixel in the scan line, e.g., to provide an adjusted brightness $I_{ADJUSTED}$:

$$I_{ADJUSTED}=s*I_{INITIAL}$$

As a result, the brightness contribution from a region decreases linearly with distance into the overlap area.

Various alignment mechanisms can be provided to maintain proper alignment of the scanning beam 320. These alignment mechanisms include reference marks on the screen. The reference marks can be in the fluorescent area and/or in one or more peripheral area outside the fluorescent area. The reference marks can reflect or emit light to create feedback light, and the feedback light can be measured by using one or more optical servo sensors to produce one or more feedback servo signals. A servo control in the scanning beam engine 180 processes this feedback servo signal to extract the information on the beam positioning and other properties of the beam on the screen and, in response, adjust the direction and other properties of the scanning beam 320 to ensure the proper operation of the display system.

For example, a feedback servo control system provide control over various beam properties, such as the horizontal positioning along the horizontal scanning direction perpendicular to the fluorescent stripes, the vertical positioning along the longitudinal direction of the fluorescent stripes, the beam focusing on the screen for control of image color (e.g., color saturation) and image sharpness, and the beam power on the screen for control of image brightness and uniformity of the image brightness across the screen.

For another example, a screen calibration procedure can be performed at the startup of the display system to measure the beam position information as a calibration map so having the exact positions of sub-pixels on the screen in the time domain. This calibration map is then used by the scanning beam engine 180 to control the timing and positioning of the scanning beam 320 to achieve the desired color purity. For yet another example, a dynamic servo control system can be provided to regularly update the calibration map during the normal operation of the display system by using servo reference marks in the fluorescent area of the screen to provide the feedback light without affecting the viewing experience of a viewer.

In some implementations, a designated servo beam is scanned over the screen by the same scanning module that scans the image-carrying excitation optical beam. This designated servo beam is used to provide servo feedback control over the scanning excitation beam to ensure proper optical alignment and accurate delivery of optical pulses in the excitation beam during normal display operation. This designated servo beam has an optical wavelength different from that of the excitation beam. As an example, this designated servo beam can be an infrared (IR) servo beam that may be invisible to the human eye. The examples below use an IR servo beam 130 to illustrate features and operations of this designated servo beam.

Referring to FIG. 7, each scanning beam engine 110 can produce an invisible servo beam 130 such as an IR beam as an example of the designated servo beam. The scanning beam engine 110 scans the servo beam 130 on to the screen 101 along with the excitation beam 320. Unlike the excitation beam 320, the servo beam 130 need not be modulated to carry image data. Thus, the servo beam 130 can be a continuous wave beam.

Servo reference marks on the screen 101 can produce feedback light 132. The servo beam 130 has a known spatial relation with the excitation beam 320. Therefore, the positioning of the servo beam 130 can be used to determine the positioning of the excitation beam 320. This relationship between the servo beam 130 and the excitation beam 320 can be determined by using reference servo marks such as a start of line (SOL) mark in a non-viewing area of the screen 101. The scanning beam engine 180 receives and detects the feedback light 132 to obtain positioning information of the servo beam 130 on the screen 101 and uses this positioning information to control alignment of the excitation beam 320 on the screen.

The servo beam 130 is invisible to the human eye and thus does not produce any noticeable visual artifact on the screen 101 during the normal operation of the system when images are produced on the screen 101. For example, the servo beam 130 can have a wavelength in a range from 780 nm to 820 nm. For safety concerns, the screen 101 can be made to have a filter that blocks the invisible servo beam 130 and/or the excitation beam 320 from exiting the screen 101 on the viewer side. In this regard, a cutoff absorbing filter with a bandpass transmission range only in the visible spectral range (e.g., from 420 nm to 680 nm) may be used to block the servo beam 130 and the excitation beam 320. The servo control of the excitation beam 320 based on the servo beam 130 can be performed dynamically during the normal operation of the system. This servo design avoids manipulation of the image-producing excitation beam 320 during the normal display mode for servo operations and thus avoids any visual artifacts that may be caused by the servo-related manipulation of the image-producing excitation beam 320.

As shown in FIGS. 5A and 5B, the servo beam 130 is directed along with the one or more excitation beams 320 through the same optical path in the scanning beam engine 180 The servo beam 130 can be overlapped with a scanning path of one excitation beam 320 or travel along its own scanning path that is different from a path of any of the excitation beams 320. The spatial relation between the servo beam 130 and each excitation beam 320 is known and fixed so that the positioning of the servo beam 130 on the screen 101 can be used to infer positioning of each excitation beam 320. An off-screen servo scheme can be used validate the relationship between the servo beam and the excitation beam, e.g., as described in U.S. Pat. No. 9,052,521.

A light source for generating the servo beam 130 can be a semiconductor laser in a light source module, e.g., the same module that generates the excitation beams 320.

Alternatively, one of the excitation beams 320 can be used as the servo beam. In this case, the servo beam 130 is the same wavelength as the excitation beams 320. Servo reference marks on the screen 101 can have different reflectivity to excitation beam 320 than surrounding areas, thereby producing feedback light 132.

Figure 11:
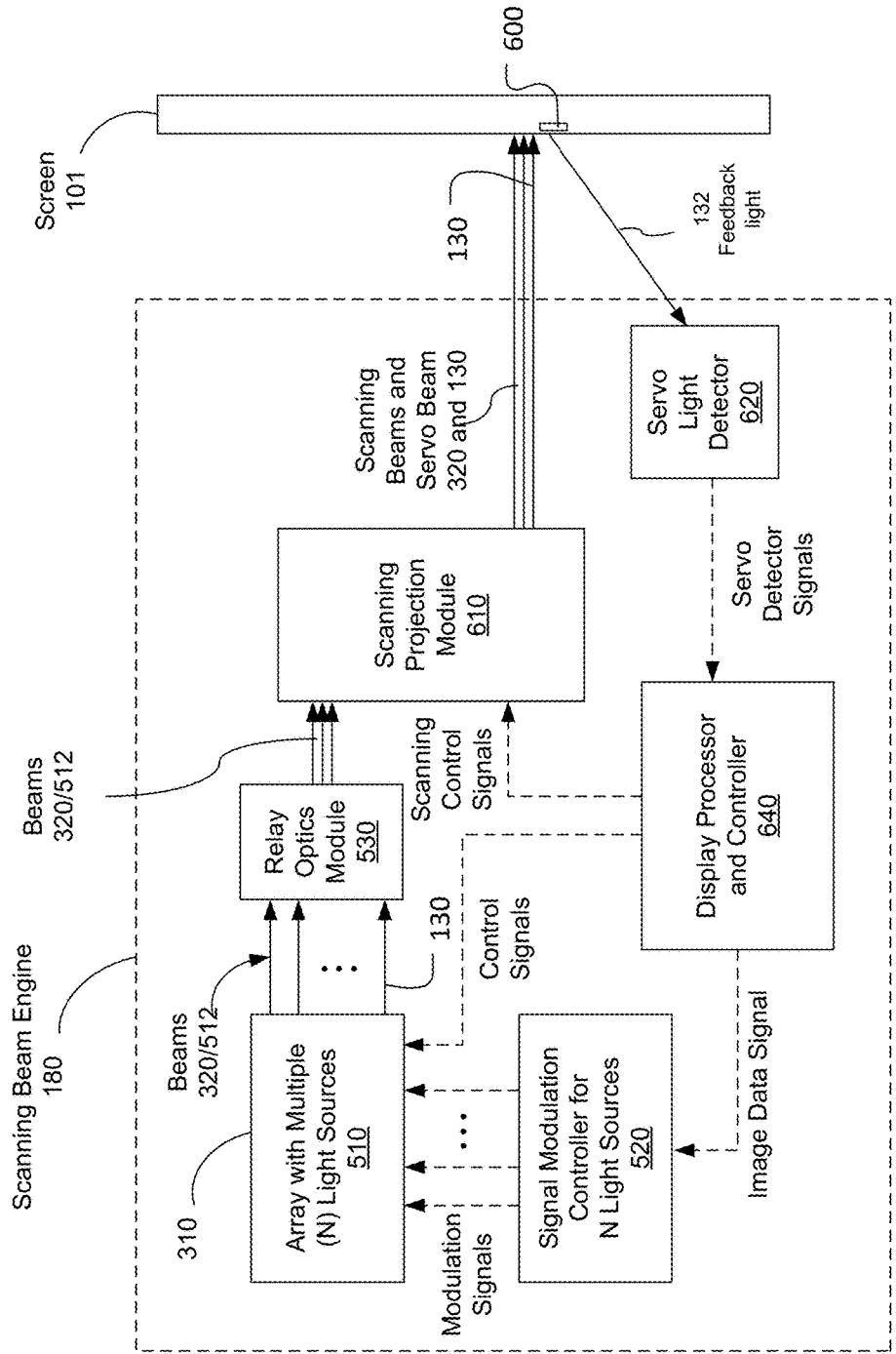
FIG. 11 shows an example of a scanning display system using a servo feedback control based on a scanning servo beam.

FIG. 11 illustrates a scanning beam display system based on a servo control using the servo beam 130. A display processor and controller 640 can be used to provide control functions and control intelligence based on one or more servo detector signals from one or more radiation servo detectors 620 that detect servo feedback light 132 from the screen 101. A single detector 620 may be sufficient, although two or more servo detectors 620 can be used to improve the servo detection sensitivity.

A plurality of servo reference marks 600 are included in the screen 101. The servo reference marks on the screen 101 can produce feedback light 132. Each servo reference mark 600 has a different reflectivity to the servo beam 130 than the surrounding area, and thus the detector 620 can detect the change in intensity when the servo beam 130 scans across the reference mark. Alternatively or in addition, the detectors 620 can also be used to collect excitation servo light 122 produced by scattering or reflecting the excitation beam 320 at the screen to provide additional feedback signals to the processor and controller 640 for the servo control.

In FIG. 11, a scanning projection module 610 is provided to scan and project the excitation beam 320 and servo beam 130 onto the screen 101. The module 610 can be in a post-objective configuration or a pre-objective configuration. As illustrated, the image data is fed to the display processor and controller 640 which produces an image data signal carrying the image data to the signal modulator controller 520 for the light sources 510, e.g., the excitation lasers. The servo light source, which is among the excitation light sources, need not be modulated to carry image data. Where the light sources are lasers, the signal modulation controller 520 can include laser driver circuits that produce laser modulation signals carrying image signals with image data assigned to different lasers 510, respectively. The laser control signals are then applied to modulate the lasers in the laser array 510, e.g., the currents for laser diodes to produce the laser beams 512.

The display processor and controller 640 also produces control signals to the light sources in the array 510 to adjust the orientation to change the vertical beam position on the screen 101 or the intensity of each beam. For example, the display processor and controller 640 can control the DC power level of each laser to control the intensity of each excitation beam 320. The display processor and controller 6400 further produces scanning control signals to the scanning projection module 610 to control and synchronize the horizontal polygon scanner and the vertical scanner.

As noted above, the reference marks 600 are made to be optically different from the areas surrounding and between the reference marks 600 to allow for optical detection of the reference marks 600 and thus to register the position of the servo beam 130 and excitation beams 320. The reference marks 600 can be formed on the screen 101 while maintaining the substantially the same optical transmission for the excitation beam 320 as the areas surrounding and between the reference marks 600. Therefore, the presence of the servo reference marks 600 does not optically interfere with the optical transmission of the excitation beam 320.

The servo reference marks 600 can be implemented in various configurations. For example, each servo reference mark 600 can be specularly reflective to light of the servo beam 130, and the areas surrounding and between the reference marks 600 can be are configured to be either transmissive, absorptive, or diffusely reflective. Assuming that the detector 620 is positioned on the incidence angle of the servo beam 130 on the screen to receive specularly reflected light, there will be a sudden increase intensity of the feedback light 132 each time the servo beam 320 crosses the reference mark 600.

Alternatively, the servo reference marks 600 can also be made diffusively reflective to light of the servo beam 130, and the areas surrounding and between the marks 600 can be specularly reflective. Assuming that the detector 620 is positioned off the incidence angle of the servo beam on the screen 101 so as to receive diffusely reflected light, there will be a sudden increase intensity of the feedback light 132 each time the servo beam 320 crosses the reference mark 600.

Returning to FIG. 7, even if the drive systems of the scanning beam engines 180 are initially calibrated so that the regions 110 do not overlap, a variety of environmental factors can result in overlap of the regions. For example, if a user touches the screen 101, it can be deflected inwardly. As another example, air pressure or wind can cause the screen 101 to move back and forth along the z-axis, i.e., toward and away from the scanning beam engines 180.

Since the excitation beams 320 are directed toward the screen 101 at an angle, this motion along the z-axis can cause the horizontal and/or vertical positions at which the excitation beams 320 impinges the screen 101 to vary. In general, if the screen 101 moves further away from the scanning beam engines 180, then the overlapping area 121 will increase, whereas if the screen moves toward the scanning beam engines 180, then the overlapping area 121 will decrease. For example, if the screen 101 moves further away from the scanning beam engines 180, in areas at the bottom of region 110a the scanning beam 320 from engine 180b would impinge the screen 101 at even lower vertical position, e.g., a position that overlaps region 110a. In addition, if the scanning beam engines 180 are be calibrated so that the adjacent regions 110 deliberately overlap, motion of the screen 101 along the z-axis can cause the amount of overlap to change, e.g., a larger or smaller number of scan lines can overlap.

Feedback from the servo beam 130 can be used to dynamically determine the distance of a display portion 110 of the screen 101 from its associate scanning beam engine 180. The display screen 101 can includes a plurality of servo reference marks 600. The servo marks 600 can extend vertically across multiple scan lines, and can arranged to be separated by a constant width in the horizontal scan direction from scan line to scan line.

Because the polygon scanner 550 rotates with a very stable rotation rate, so long as the screen 101 remains fixed in the z-axis, the time between receiving signals from two adjacent servo marks 600 will remain stable. However, if the screen 101 moves toward the scanning beam engine 180, the space between the two adjacent servo marks 600 will subtend a greater angle. Consequently it will take a longer time for the beam 130 to scan between the servo marks 600, and the time between receiving the signals will increase. Conversely, if the screen 101 moves away from the scanning beam engine 180, the space between the two adjacent servo marks 600 will subtend a smaller angle. Consequently it will take a short time for the beam 130 to scan between the servo marks 600, and the time between receiving the signals will decrease.

The controller 640 (see FIG. 11) can receive the signals from the detector 620, determine the time difference between the signals from two adjacent servo marks 600, and calculate a distance Z based on this time difference. For example, the time difference can be related to the distance Z by a lookup table or by a predefined function. For example, to first order the change dz and dt are proportional, so that dz=alpha*dt. The lookup table can be a list of alphas for the chosen servo mark pairs. Once the distance Z is determined, a change in the amount of overlap can be calculated based on geometric principles. For example, a difference $\Delta Y$ from a default distance $Y_{DEFAULT}$ can be calculated, $$\Delta Y = Z*\tan(\theta) - Y_{DEFAULT}$$

where $\theta$ is the angle of incidence of the beam on the screen 101 at the edge of the region 110, and $Y_{DEFAULT} = Z_{DEFAULT}*\tan(\theta)$ where $Z_{DEFAULT}$ is the default Z distance as the used in the initial calibration.

With the distance difference $\Delta Y$ known, the scaling factor s can be determined dynamically. For example, one algorithm to calculate the scaling factor s for a line n is:

$$s = n\Lambda/[(2\Lambda+(A-B))+\Delta Y](MAX1)$$

By monitoring the time duration between two reference marks, the instantaneous Z-position of the screen 101, the amount of overlap, and finally the dynamic scale factor can be determined.

A more complex algorithm can be used determine the scale factor, and can take into account the adjustment on a pixel-by-pixel basis along the x-axis (i.e., the horizontal scanning direction). For example, the scale factor for a line n can be $$Sn(x, t) = n \cdot S(x, t)|_{MAX=1}$$

where $$S(x, t) = \frac{1}{Y(x, t)} = \frac{1}{Y_0(x) + \Delta Y(t)} = \frac{1}{Y_0(x)} \cdot \frac{1}{1 + \frac{\Delta Y(t)}{Y_0(x)}} \approx \frac{1}{Y_0(x)} \cdot \sum_{p=0}^{P} \left[-\frac{\Delta Y(t)}{Y_0(x)}\right]^p$$

where $Y_0$ is nominal overlap after initial calibration.

If the local overlap information $\Delta Y(x, t)$ is available, then this information can be substituted in the equation above to provide a local scale factor.

These various techniques permit the intensity of the scanning beam in the overlapping area to be reduced, thus reducing or eliminating visual artefacts at the intersection between the display regions. Moreover, intensity can be adjusted dynamically, which permits the display to compensate for effects, e.g., touch by user or wind, that might move the display screen.

While this patent application contains many specifics, these should not be construed as limitations on the scope of an invention or of what may be claimed, but rather as descriptions of features specific to particular embodiments of the invention. Certain features that are described in this patent application in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this patent application.

What is claimed is:

1. A display system comprising:
a display screen;
a plurality of subsystems each including
a light source to generate at least one beam, the at least one beam including an excitation beam that carries image information, an optical energy carried by the excitation beam controllable by one or more scaling factors,
a beam scanning module to receive the at least one beam and to direct the at least one beam onto a display region of the display screen, the beam scanning module configured to scan the at least one beam along a scanning direction across at least a portion of the display region, and
a servo feedback detector positioned to receive feedback light of one or more of the at least one beam scanning on the display region, to detect a position of the at least one beam on the display screen from the feedback light, and to produce a monitor signal indicative of the position of the at least one beam on the display region,
wherein two adjacent subsystems of the plurality of subsystems are configured such that in operation a first area scanned by one or more excitation beams of a first subsystem of the adjacent subsystems overlaps with a second area scanned by one or more excitation beams of a second subsystem of the adjacent subsystems in an overlap region; and
a control system coupled to the plurality of the subsystems and configured to
determine a range of the overlap region between the adjacent subsystems based on the monitor signals from the servo feedback detectors of the adjacent subsystems, and
determine the scaling factors for the excitation beams for the overlap region of the adjacent subsystems.

2. The system of claim 1, wherein each beam scanning module is configured to scan the at least one beam to create a plurality of scan lines on the portion of the display screen that are substantially parallel along the scanning direction and spaced apart along a second direction perpendicular to the scanning direction, and wherein the two adjacent subsystems are separated along the second direction.

3. The system of claim 2, wherein the control system is configured to determine a first position along the second direction for the plurality of scan lines based generated by a first subsystem of the two adjacent subsystems based on a first monitor signal from the servo feedback detector of the first subsystem, to determine a second position along the second direction for the plurality of scan lines based generated by a second subsystem of the two adjacent subsystems based on a second monitor signal from the servo feedback detector of the second subsystem, and determine the range of overlap region from the first position and the second position.

4. The system of claim 3, wherein the display screen comprises a plurality of features at which reflectivity changes for a beam from the at least one beam, the features separated along the scanning direction, and the control system is configured to determine the position based on a time difference between detecting the plurality of features.

5. The system of claim 4, wherein the features comprise specular feedback marks surrounded by a diffusely reflective background.

6. The system of claim 4, wherein the at least one beam including a servo beam of different wavelength than the excitation beam, and wherein the servo feedback detector is configured to monitor reflected light of the servo beam.

7. The system of claim 4, wherein the control system is configured to determine a distance between the light source that generates the one or more of the at least one beam and the display region of the screen along a direction perpendicular to the scanning direction based on the time difference, and to determine the position based on the determined distance.

8. The system of claim 2, wherein the control system is configured to determine a position of the at least one beam along the scanning direction based on the monitor signals, to determine a variation of the range of the overlap region based on the position along the scanning direction, and to adjust the respective scaling factors for the excitation beams associated with the overlap region of the adjacent subsystems.

9. The system of claim 8, wherein the light source and beam scanning module are configured such that the plurality of scan lines comprise lines that oscillate in the second direction.

10. A display system comprising:
a display screen;
a plurality of subsystems each including
  a light source to generate at least one beam, the at least one beam including an excitation beam that carries image information,
  a beam scanning module to receive the at least one beam and to direct the at least one beam onto a display region of the display screen, the beam scanning module configured to scan the at least one beam along a scanning direction across at least a portion of the display region, and
  a servo feedback detector positioned to receive feedback light of one or more of the at least one beam scanning on the display region, to detect a position of the at least one beam on the display screen from the feedback light, and to produce a monitor signal indicative of the position of the at least one beam on the display region,
wherein two adjacent subsystems of the plurality of subsystems are configured such that in operation a first area scanned by one or more excitation beams of a first subsystem of the adjacent subsystems overlaps with a second area scanned by one or more excitation beams of a second subsystem of the adjacent subsystems in an overlap region; and
a control system coupled to the plurality of the subsystems and configured to
  determine a range of the overlap region between the adjacent subsystems based on the monitor signals from the servo feedback detectors of the adjacent subsystems, and
  adjust based on the range of the overlap region an intensity of the excitation beam so as to decrease non-uniformity of brightness caused by the overlap of the first area and the second area.

11. The system of claim 10, wherein each beam scanning module is configured to scan the at least one beam to create a plurality of scan lines on the portion of the display screen that are substantially parallel along the scanning direction and spaced apart along a second direction perpendicular to the scanning direction, and wherein the two adjacent subsystems are separated along the second direction.

12. The system of claim 11, wherein the control system is configured to determine a first position along the second direction for the plurality of scan lines based generated by a first subsystem of the two adjacent subsystems based on a first monitor signal from the servo feedback detector of the first subsystem, to determine a second position along the second direction for the plurality of scan lines based generated by a second subsystem of the two adjacent subsystems based on a second monitor signal from the servo feedback detector of the second subsystem, and determine the range of overlap region from the first position and the second position.

13. The system of claim 12, wherein the display screen comprises a plurality of features at which reflectivity changes for a beam from the at least one beam, the features separated along the scanning direction, and the control system is configured to determine the position based on a time difference between detecting the plurality of features.

14. The system of claim 13, wherein the features comprise specular feedback marks surrounded by a diffusely reflective background.

15. The system of claim 13, wherein the at least one beam including a servo beam of different wavelength than the excitation beam, and wherein the servo feedback detector is configured to monitor reflected light of the servo beam.

16. The system of claim 13, wherein the control system is configured to determine a distance between the light source that generates the one or more of the at least one beam and the display region of the screen along a direction perpendicular to the scanning direction based on the time difference, and to determine the position based on the determined distance.

17. The system of claim 11, wherein the control system is configured to determine a position of the at least one beam along the scanning direction based on the monitor signals, to determine a variation of the range of the overlap region based on the position along the scanning direction, and to adjust an intensity of the excitation beam so as to decrease non-uniformity of brightness caused by the variation in the range of the overlap region.

18. The system of claim 17, wherein the light source and beam scanning module are configured such that the plurality of scan lines comprise lines that oscillate in the second direction.

19. A display system comprising:
a display screen;
a plurality of subsystems each including
  a light source to generate at least one beam, the at least one beam including an excitation beam that carries image information, an optical energy carried by the excitation beam controllable by one or more scaling factors,
  a beam scanning module to receive the at least one beam and to direct the at least one beam onto a display region of the display screen, the beam scanning module configured to scan the at least one beam along a scanning direction across at least a portion of the display screen, wherein the beam scanning module is configure to scan the at least one beam to create a plurality of scan lines on the portion of the display screen that are substantially parallel along the scanning direction and that are spaced apart along a second direction perpendicular to the scanning direction and that oscillate in the second direction, and a servo feedback detector positioned to receive feedback light of one or more of the at least one beam scanning on the display region, to detect a position of the at least one beam on the display screen from the feedback light, and to produce a monitor signal indicative of the position of the at least one beam on the display region, wherein two adjacent subsystems of the plurality of subsystems that are separated along the second direction are configured such that in operation a first area scanned by one or more excitation beams of a first subsystem of the adjacent subsystems overlaps with a second area scanned by one or more excitation beams of a second subsystem of the adjacent subsystems in an overlap region; and a control system coupled to the plurality of the subsystems and configured to determine a position of the at least one beam along the scanning direction based on the monitor signals, and adjust an intensity of the excitation beam based on the position along the scanning direction so as to decrease non-uniformity of brightness caused by overlap of oscillating scan lines from excitation beams from the adjacent subsystems.

20. The display system of claim 19, wherein the control system is configured to adjust the intensity of the excitation beam on a pixel-by-pixel basis along the scan direction based on both image data and a scaling factor determined from a range of overlap of the oscillating scan lines from the excitation beams from the adjacent subsystems.

\* \* \* \* \*